Figure 1:
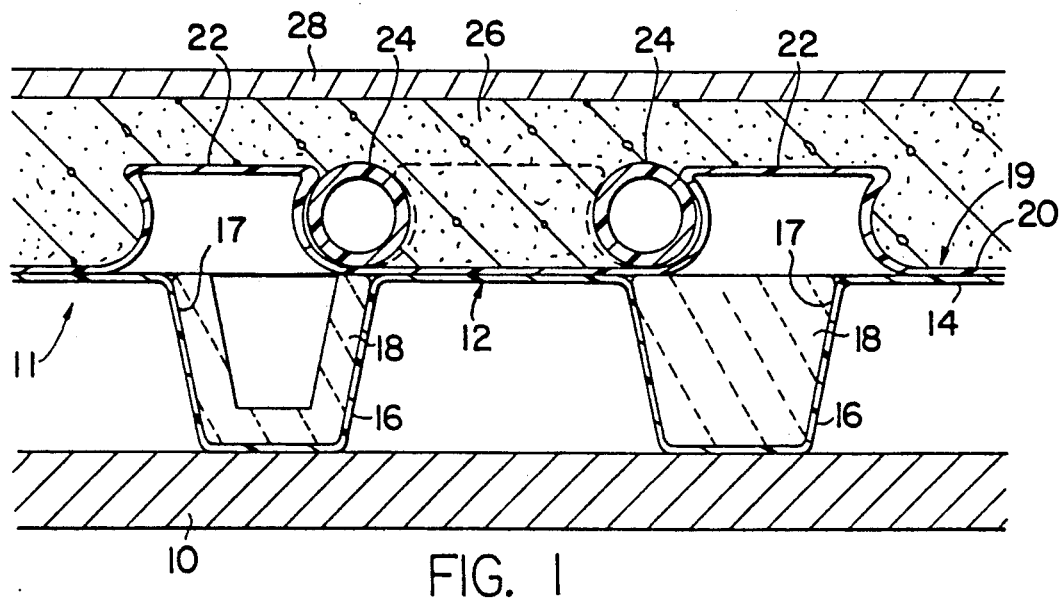

United States Patent [19]

Siegmund

[11] Patent Number: 5,042,569
[45] Date of Patent: Aug. 27, 1991

[54] SURFACE ELEMENT FOR A HEATABLE FLOOR WITH HOLLOW SPACES

[75] Inventor: Helmut D. Siegmund, Bad Honnef, Fed. Rep. of Germany

[73] Assignee: Siegmund GmbH, Bad Honnef, Fed. Rep. of Germany

[21] Appl. No.: 419,883

[22] Filed: Oct. 11, 1989

[30] Foreign Application Priority Data

Nov. 4, 1988 [DE] Fed. Rep. of Germany ....... 3837562

[51] Int. Cl.$^5$ .................. F24H 9/06; F24D 19/02; E04B 5/48; E04C 2/32
[52] U.S. Cl. .................. 165/56; 165/49; 52/220; 52/792
[58] Field of Search .................. 52/220, 792; 165/56, 165/49

[56] References Cited

U.S. PATENT DOCUMENTS

| | | | |
|---|---|---|---|
| 2,818,235 | 12/1957 | Baran | 165/56 |
| 2,956,785 | 10/1960 | Riehl | 52/220 X |
| 3,597,891 | 8/1971 | Martin | 52/792 X |
| 4,852,315 | 8/1989 | Fukayama | 52/220 |
| 4,878,332 | 11/1989 | Drake | 52/220 X |

FOREIGN PATENT DOCUMENTS

| | | | |
|---|---|---|---|
| 2650160 | 5/1978 | Fed. Rep. of Germany | 165/56 |
| 2823236 | 11/1979 | Fed. Rep. of Germany | 52/220 |
| 2930688 | 2/1981 | Fed. Rep. of Germany | 165/56 |
| 3024140 | 1/1982 | Fed. Rep. of Germany | 165/56 |
| 3342043 | 6/1984 | Fed. Rep. of Germany | 165/56 |
| 3217498 | 3/1988 | Fed. Rep. of Germany | . |
| 925470 | 9/1958 | United Kingdom | 52/220 |

Primary Examiner—David A. Scherbel
Assistant Examiner—Deborah McGann Ripley

[57] ABSTRACT

A surface heating element for placement on a sub-floor and for making a heatable hollow space floor includes a plastic sheet having deep drawn protuberances forming spacers strengthened by ceramic support bodies or by a hardened finish material. The same sheet, or a second sheet connected to it, forms a carrier plate for carrying hot water tubes or other heating elements. The carrier plate may include deep drawn dogs, extending in a direction opposite to the protuberances, for holding the heating elements to the carrier plate; and a hardened finish material may be used to embed the heating elements.

7 Claims, 2 Drawing Sheets

SURFACE ELEMENT FOR A HEATABLE FLOOR WITH HOLLOW SPACES

The invention concerns a surface element for a heatable floor with hollow spaces between the sub-floor and upper floor, in which surface element a spacer plate lies on the sub-floor with spacer elements distributed over its surface and in which surface element heating elements of a surface heating arrangement are located between the upper floor and the spacer plate.

In a floor with hollow spaces of the previously mentioned type, known from DE-PS 32 17 498, the spacer plate consists of two plastic sheets between which closed nubs forming air cushions are arranged as spacer elements. After the transfer of this spacer plate to the sub-floor, the surface so formed is treated as a customary sub-floor with regard to the placement of the in-floor heating. The mentioned spacer plate has the disadvantage that it possesses no great carrying capacity. With the conduction of warm air through the hollow spaces formed between the spacer elements together with a simultaneous high loading of the floor, there exists the danger that the walls of the air cushions will be deformed or indeed torn and that the upper floor will then sink. This is particularly true of the floor's behavior in the case of a fire. Consequently, the installation of such a heatable hollow space floor requires a double work effort, since first the spacer plates are set and subsequently the heating arrangement must be installed.

The invention has as its object, the provision of a simple to install surface element of the initially mentioned type that has a high carrying capacity and which also does not allow the upper floor to sink under a condition of high heating.

This object is solved in accordance with the invention in that the spacer plate consists of a plastic sheet wherein the spacer elements are formed as deep drawn protuberances, which are strengthened by ceramic supporting bodies, and in that the plastic sheet is connected on its side facing away from the protuberances with a carrier plate for the heating elements. The ceramic supporting bodies can be inserted in the recesses formed by the protuberances either as massive elements or as cup-shaped elements, or the ceramic supporting bodies can be hollow bodies placed over the protuberances. The insertion of the supporting bodies into the recesses of the protuberances has the advantage that the supporting bodies can be held fast and accordingly pre-assembled by the carrier plate fastened to the sheet. In both cases, nevertheless, the supporting bodies constitute the supporting elements of the spacer plate, with the ceramic material withstanding high temperatures as well as a high pressure loading. During the connection of the carrier plate with the spacer plate both can be placed in accordance with such a work process that the required work is no greater than in the case of the placement of a customary in-floor heating arrangement.

With respect to manufacturing techniques, it is practical for the protuberances and for the supporting bodies to have the shape of truncated cones.

According to a preferred embodiment of the invention, the support plate is formed of a second plastic sheet in which clamping dogs are formed for holding the heating elements. In this case, the two plastic sheets can be directly welded or glued to one another. There exists also the possibility that a heat insulating layer can be arranged between the two plastic sheets, if it is strived for that the heating elements are to be isolated from the hollow space, as described in DE-PS 32 17 498. In place of the second plastic sheet, a heat insulation plate laminated with a holding sheet can also be provided to which the heating elements, such as for example hot water conducting heating pipes, are fastened with holding clamps.

Instead of a plastic sheet including the spacer elements and another plastic sheet including the clamping dogs for the heating elements, there can also be provided, a single plastic sheet in which the spacer elements are formed outwardly from one side of the sheet in the form of protuberances and in which the clamping dogs are formed outwardly from the other side of the sheet by deep forming. In this case, also, the spacer elements can be strengthened by ceramic supporting bodies as in the previously described solution. Instead of a strengthening by ceramic supporting bodies, however, a liquid finish material can be applied to the side of the sheet containing the clamping dogs after the insertion of the heating tubes, which finish material fills the recesses formed by the protuberances and after hardening not only embeds the heating tubes but also forms the spacer elements. The plastic sheet requires, in this case, to be only so strong that it can serve on one hand as a mold for the casting of the spacer elements and, on the other hand, to hold the heating tubes in place until the finish is hardened.

The following description explains the invention in connection with the accompanying drawings by way of exemplary embodiments. The drawings show:

FIG. 1—A schematic cross-section through a hollow space floor with a surface element according to a first embodiment of the invention.

Figure 2:
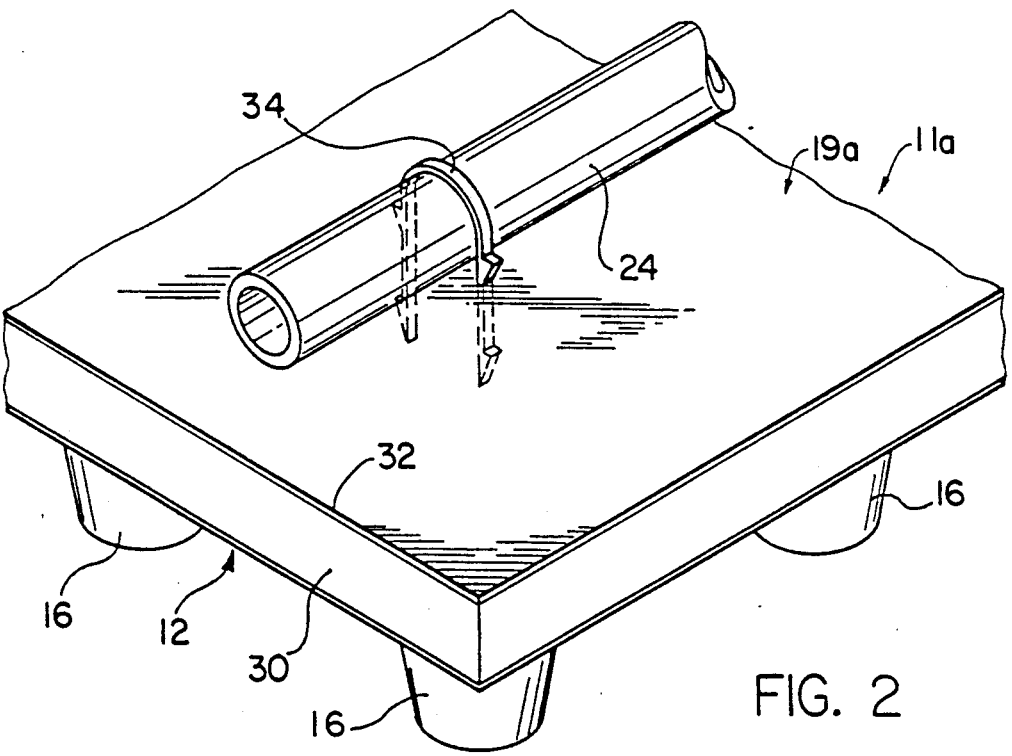

FIG. 2—A perspective partial illustration of a surface element according to a second embodiment of the invention.

Figure 3:
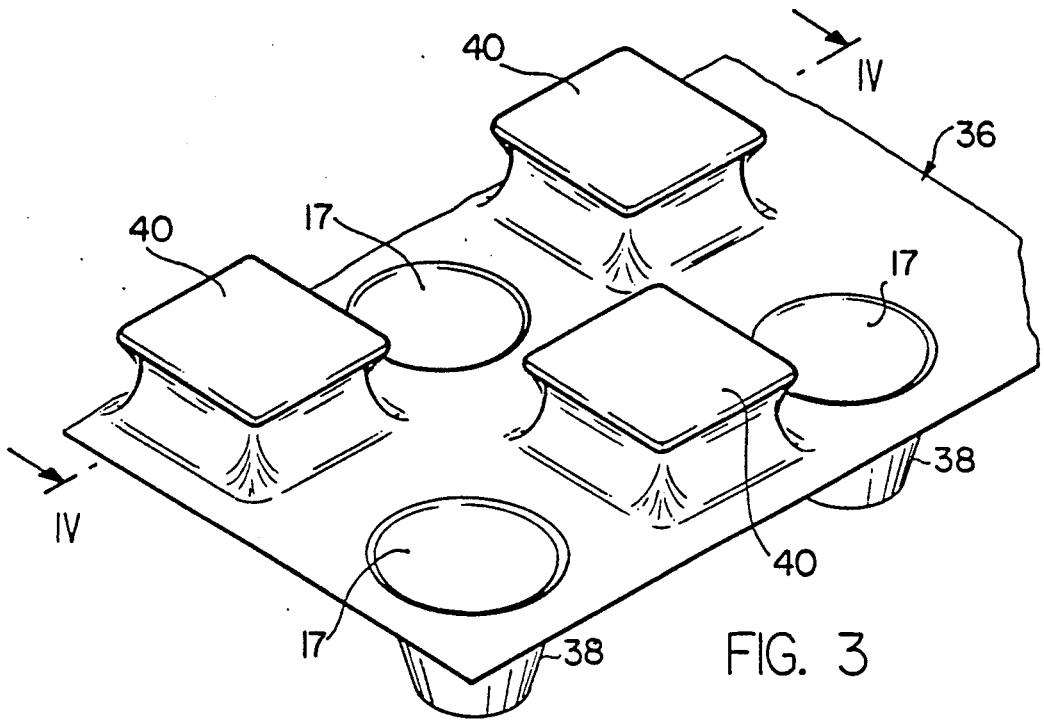

FIG. 3—A perspective view of a spacer plate providing plastic sheet according to a third embodiment of the invention.

Figure 4:
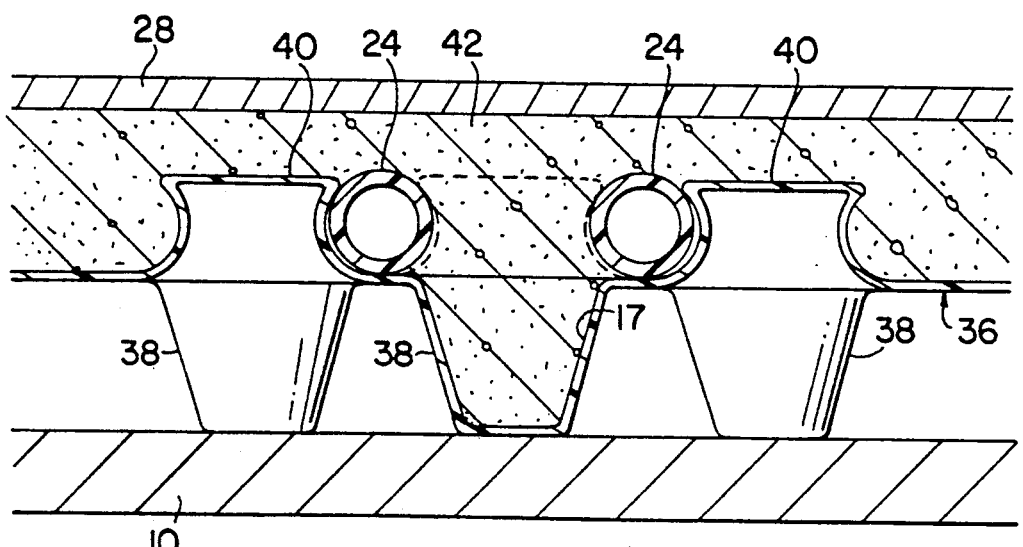

FIG. 4—A section corresponding to FIG. 1 through a hollow space floor using the plastic sheet of FIG. 3.

In FIG. 1, a surface element embodying the invention is shown generally at 11. This surface element 11 includes a spacer plate 12 and a carrier plate 19. The spacer plate 12 is arranged on a sub-floor 10 and is made of a plastic sheet 14 in which protuberances 16, of truncated cone shape, are formed by deep drawing. These protuberances are distributed with regular spacing over the entire surface of the spacer plate 12. In the recess 17 formed by each protuberance 16, is inserted a ceramic supporting body 18 having a shape suiting that of the protuberance. This supporting body 18 can be made as a solid piece of material or can also be made as a cup-shaped hollow body, as indicated in the middle of one spacer element. On the upper side of the plastic sheet 14 is arranged the carrier plate 19 made of a second plastic sheet 20 which is welded, glued or connected in some other way to the first plastic sheet 14. In the second plastic sheet 20 are clamping dogs 22, formed by deep drawing, between which the heating tubes 24 of an in-floor heating arrangement are placed. The second plastic sheet 20 carries a finish material 26 which embeds the heating tubes 24 and which is covered by an upper floor layer 28. The surface element 11 comprised of the spacer plate 12 and of the carrier plate 19, can be laid in its entirety on the sub-floor 10 and can be connected with neighboring surface elements, for example by use of compression fasteners or in other ways.

In the case of the embodiment illustrated in FIG. 2, the spacer plate 12 is formed in the same way as has been described in connection with FIG. 1. The carrier plate 19a, lying on the spacer plate 12, consists of a heat insulating layer 30, which for example, consists of polyurethane rigid foam laminated with a supporting sheet 32. To this carrier plate 19a, the heating tubes 24 are securely fastened with the help of clamps 34 sticking through the supporting sheet 32, as is in itself known. In this case, the carrier plate 19a can also be glued to the spacer plate 12 so that the surface element 11a so formed can be installed as a single unit.

As is known, a surface element so formed has a high carrying capacity which is not lost in the case of a fire. A heatable hollow space floor can be constructed wherein, because of the formation of the surface element either with an isolation layer between the carrier plate and the spacer plate or without an isolation layer between the two plates, different possibilities for a combination of in-floor heating with a ventilating or warm air apparatus are possible.

Whereas, in the embodiment of FIG. 1, two plastic sheets 14 and 20 are used for holding the ceramic supporting bodies and for holding the heating tubes, in the case of the embodiment of FIGS. 3 only a single plastic sheet 36 is provided on one side of this sheet 36 the truncated cone recesses 17 and protuberances 38 are provided by deep forming on the other side of this sheet 36 clamping dogs 40 are formed by deep forming for holding the heating tubes. This sheet can be used in the same way as the two sheets 14 and 20 of FIG. 1. That is, ceramic supporting bodies can be inserted in the recesses 38 as described in connection with FIG. 1. In accordance with the solutions of FIGS. 3 and 4, one can also, however, spare the insertion of the ceramic supporting bodies since the heating tube 24 embedding finish material 42 upon application will also enter the recesses 38 and completely fill them. After hardening, the finish material then forms the actual spacer elements, the protuberances 38 of the sheet 36 serving only as molds for the casting of the spacer elements.

I claim:

1. A surface element for a heatable hollow space floor having a sub-floor and an upper floor, said surface element including a spacer plate having a plurality of distributed spacer elements for engagement with said sub-floor, and said floor also having heater elements of a surface heating arrangement located between said upper floor and said spacer plate, characterized in that said spacer plate consists of a first plastic sheet with deep drawn protuberances extending from one side thereof and serving as said spacer elements, which protuberances are strengthened by a plurality of ceramic support bodies each associated with a respective one of said protuberances, said plastic sheet on its side facing away from the protuberances having fixed to it a carrier means for holding said heating elements, said protuberances being spaced from one another to create void spaces between said plastic sheet and said sub-floor for the circulation of air.

2. A surface element according to claim 1, further characterized in that each of said protuberances defines a recess in said plastic sheet, and in that each of said ceramic bodies is inserted into the recess defined by its associated one of said protuberances.

3. A surface element according to claim 1, further characterized in that said carrier means is formed from a second plastic sheet, in which second sheet clamping dogs are formed for holding said heating elements.

4. A surface element according to claim 3, further characterized in that said first and second plastic sheets are connected directly to one another.

5. A surface element for a heatable hollow space floor having a sub-floor and an upper floor, said surface element including a spacer plate having a plurality of distributed spacer elements for engagement with said sub-floor, and said sub-floor also having heater elements of a surface heating arrangement located between said upper floor and said spacer plate, characterized in that said spacer plate consists of a plastic sheet with deep drawn protuberances extending from one side thereof serving as said spacer elements and with deep drawn clamping dogs extending from the other side thereof for holding said heating elements.

6. A surface element according to claim 5, further characterized in that said deep drawn protuberances are strengthened by a plurality of ceramic supporting bodies each associated with a respective one of said protuberances.

7. A surface element according to claim 5, further characterized in that each of said protuberances defines a recess, and in that a finish material is applied to said spacer plate which fills said recesses defined by said protuberances and which also embeds said heating elements held by said clamping dogs.

* * * * *